Sept. 14, 1943.    J. T. CORRIGAN    2,329,594
HYDRAULIC TRANSMISSION
Filed Oct. 30, 1941    2 Sheets-Sheet 1
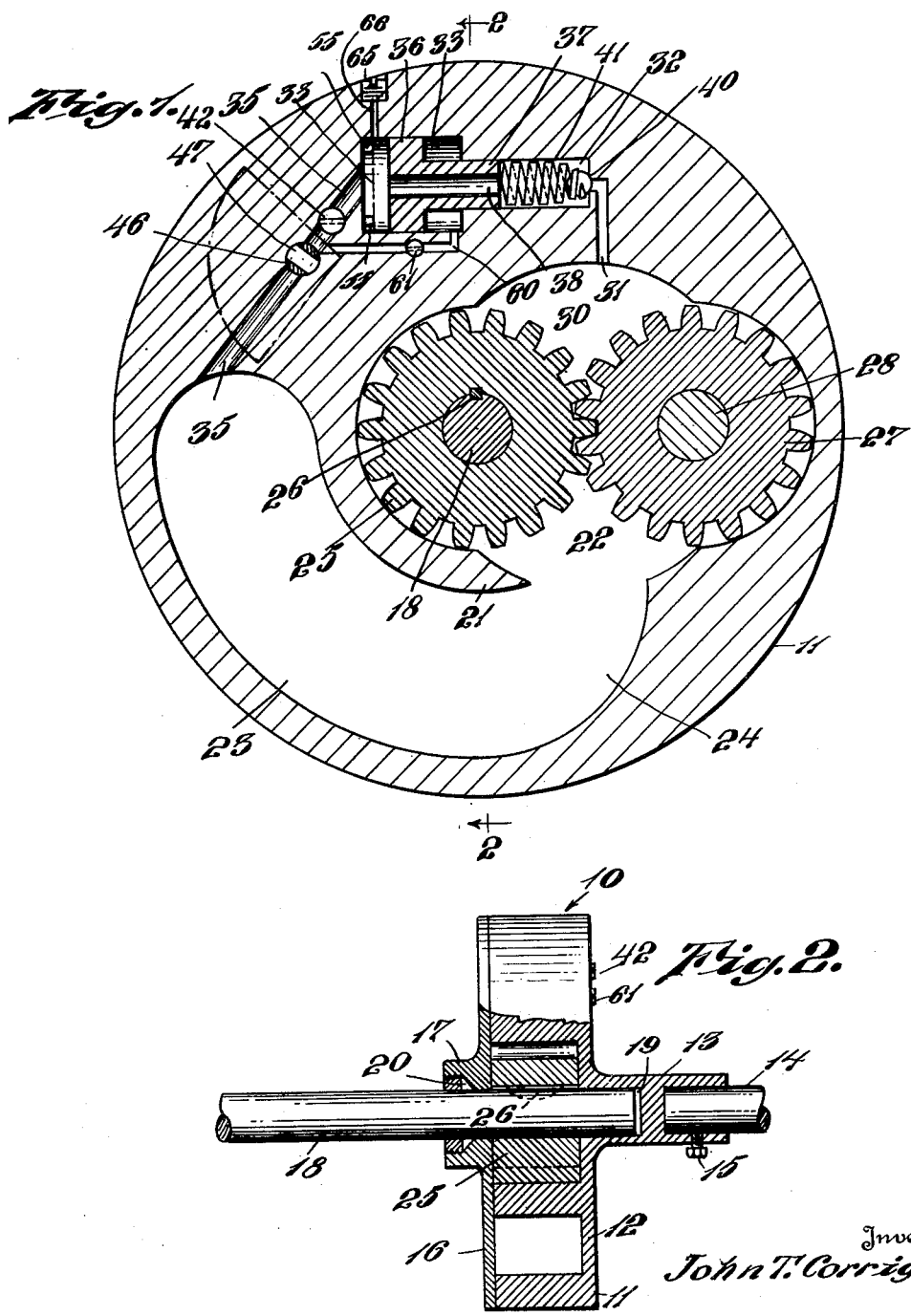
Inventor
John T. Corrigan
By Barlow & Barlow
Attorneys Sept. 14, 1943.　　　J. T. CORRIGAN　　　2,329,594
HYDRAULIC TRANSMISSION
Filed Oct. 30, 1941　　　2 Sheets-Sheet 2

Inventor
John T. Corrigan
By Barlow & Barlow
Attorneys

Patented Sept. 14, 1943

2,329,594

UNITED STATES PATENT OFFICE 2,329,594

HYDRAULIC TRANSMISSION

John T. Corrigan, Newport, R. I.

Application October 30, 1941, Serial No. 417,176

12 Claims. (Cl. 192—61)

This invention relates to hydraulic transmission mechanisms, and is particularly concerned with improved hydraulic means for the transmission of power from a prime mover to a shaft to be driven. More specifically, this invention constitutes an improvement or simplification of the type of hydraulic transmission disclosed in my prior Patent No. 2,191,340, dated February 20, 1940, on Hydraulic transmission mechanism.

One of the objects of the present invention is to provide a hydraulic transmission mechanism which, when used in conjunction with the power system and in the driving connections of motor vehicles, will eliminate the usual speed-changing gear transmissions, and will be entirely automatic in its action so as to maintain a substantially uniform torque on the prime mover at varying speeds and under changing load conditions.

Another object of the invention is the provision for the circulation of the liquid in the hydraulic system of the transmission automatically whenever the speed of rotation of the shaft driven by the transmission becomes less than that of the driving shaft.

A further object of the invention is to provide a valve which will be so arranged as to be readily actuated by the pumped liquid itself and will be responsive to the speed of movement thereof for controlling the driving connection of the driving and driven shafts under variable load conditions and to maintain the direct connection of the shafts whereby they may be driven in unison at any desired speed as long as the load conditions do not exceed the power being transmitted from the prime mover to the driven shaft.

It is the aim of the present invention to control the speed of movement of the pumped liquid in direct ratio to the speed differential between the relative speeds of the driving and driven shafts whereby correspondingly greater resistance to the movement of pumped fluid will result as the speed of the driving shaft exceeds that of the driven shaft until the rotational speed and the power required by the driven shaft reaches a balance and equals the rotational speed and the power yielded by the driving shaft, at which time the system becomes locked together and the whole hydraulic transmission will revolve as a unit with the driving and driven shafts.

Another object of the invention is to provide a valve of simple form which will be subjected to both spring pressure and to the varying fluid pressure of the outlet of a gear pump in the circulation line of a hydraulic system so as to automatically restrict the opening through the supply passage leading to a chamber housing said valve directly as the difference of the speeds of admission and of discharge of the motive fluid to and from said chamber so as to tend to force the valve into closed position whenever the fluid pressure in the supply passage exceeds said spring pressure to move the valve in an open position.

Another object of the invention is to provide means including a manually adjustable device for regulating the speed of movement of the valve in a direction to reduce the opening through which the actuating fluid for operating the valve is admitted from a supply passage communicating with a fluid pump.

Another object of the invention is to provide a hydraulic transmission which will automatically change the transmission ratio between the driving and driven shafts whenever the resistance or load conditions encountered become too great for a direct drive of these shafts.

Another object of the invention is the prevention of breakage or of undue strain upon the driving and driven members of the hydraulic transmission mechanism whenever the torque becomes too great or due to too rapid acceleration of the vehicle.

With these and other objects in view, the invention consists of certain novel features of construction, as will be more fully described and particularly pointed out in the appended claims.

In the accompanying drawings:

Fig. 1 is a sectional front elevational view of a hydraulic transmission embodying the present invention and showing the parts in the positions that they assume when the driving and driven shafts rotate at the same speed and a direct drive of the shafts results;

Fig. 2 is a fragmentary longitudinal sectional view, on reduced scale, taken substantially on line 2—2 of Fig. 1;

Figure 3:
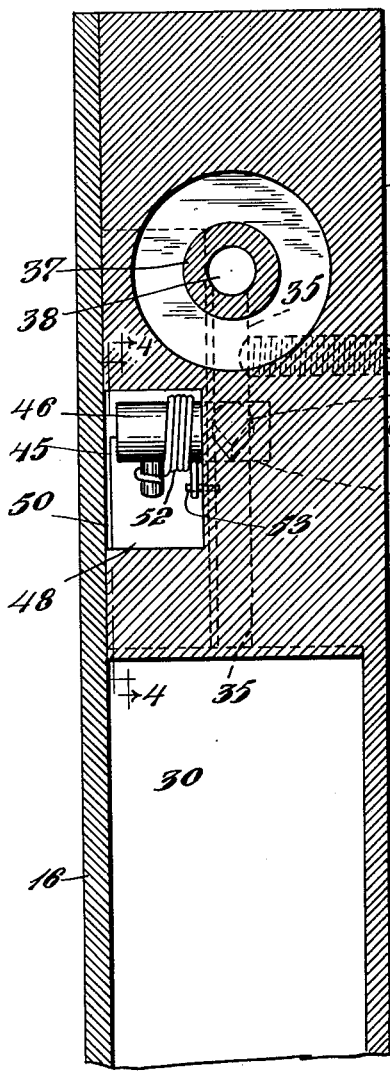
Fig. 3 is a fragmentary sectional view on enlarged scale and mostly diagrammatic in character showing the relative positions between several of the parts of the device as the view in Fig. 1 looking in the direction of the arrows of line 2—2.

The present invention contemplates as one feature the action of the pumped liquid itself during its circulation at varying speeds of flow and pressures upon a combined piston and ball valve located in a chamber in the circulation line of a hydraulic system, which chamber has a supply passage leading thereto from a pump gear mechanism. The valve is subjected to the varying pressure of fluid in the outlet side of the pump gear mechanism in communication with the supply passage for moving the valve into its closed position. Whenever the fluid pressure in the admission side of the chamber is high enough to overcome the spring pressure normally holding the valve closed, this increased pressure will unseat the valve and fluid will be admitted to the chamber and flow behind the valve where it will build up pressure, if its discharge is restricted, and tend to urge the valve into a closed position. The speed of movement of the valve to its closed position is directly proportional to the difference in speeds of the liquid being pumped by the pump gears into the space of this chamber behind the valve and the speed of discharge of the pumped liquid from this space for moving the piston and the attached ball valve to press the latter into a closer liquid restricting position to restrict the opening from the supply passage to the chamber.

Another feature of the invention is the provision of a centrifugally operated valve which will operate automatically to control the discharge of liquid from the liquid circulation system whenever slippage or relative rotational movement occurs between the driving and driven shafts; and this centrifugal valve is so arranged that the centrifugal action set up by the rotation of the casing or housing containing the transmission mechanism will act to swing a weighted arm and move the valve in a direction to gradually restrict the flow of liquid to the storage reservoir as the driving and driven shafts are gradually being brought up to speed and for a direct drive so that when the shafts rotate together at the same speed the centrifugal valve will be moved into its closed position to completely cut off the circulation of fluid in the main circulation line and the two shafts will become locked together to establish a direct drive and the whole hydraulic mechanism will revolve bodily as a unit with the driving and driven shafts; and the following is a more detailed description of the present embodiment of this invention, illustrating the preferred means by which these advantageous results may be accomplished:

With reference to the drawings, 10 generally designates the housing assembly of the hydraulic transmission mechanism which comprises an outer casing member 11 of cylindrical shape closed at one end by a back wall 12 having an exterior hollow central hub 13 within which is received and suitably secured therein one end of the driven shaft 14, such as for example by means of a stud 15 or by a key (not shown). A removable cover plate 16 is suitably secured to the other end of the casing to provide an oil-tight end closure therefor, and this cover plate is provided with a sleeve-like central hub 17 through the axial bore of which projects interiorly into the casing 11 the driving shaft 18. The shaft 18 is arranged to be rotated by any suitable motive power such, for example, as by means of an internal combustion engine. As illustrated in Fig. 2, the inner end of the shaft 18 extends through the back wall 12 of the casing and is suitably journaled in a short, axial bore 19 formed from the end wall 12 into the hub 13. Suitable packing material 20 of any well-known type of construction may be provided for sealing the portion of the shaft 18 that is journaled in the hub 17 and extends interiorly of the casing.

As shown in Fig. 1, the interior of the casing 11 is provided with an arcuate partition 21 concentric with the casing dividing said interior into an inner transversely disposed gear compartment 22 and an outer arcuate oil compartment 23, the latter being filled with oil or other fluid of a viscosity suitable for the purposes of this hydraulic transmission and forming the supply reservoir therefor. The partition 21 is provided with an opening 24 giving communication between the oil compartment 23 and the gear compartment 22.

Disposed within the casing 11 and contained in the gear compartment 22 thereof is the pump gear mechanism for effecting the variable speed connection between the driving and driven shafts as will be hereinafter described.

Mounted upon the end portion of the driving shaft 18 extending within and passing through the interior of the casing, is the central pump gear element 25 which is fixedly secured to the shaft 18, as by a key 26, so as to rotate at all times as one with the driving shaft 18 as it is revolved by the engine of a motor vehicle or other prime mover. The pump gear 25 meshes with a pump gear 27 loosely rotatable upon the stud 28 which is rigidly secured at one end to the back wall 12 of the casing 11. The pump gear 27 loosely meshes with and is driven by the pump gear 25 so that when the pump gear 25 is revolved by the driving shaft 18 the pump gears 25 and 27 will rotate together. The walls of the gear compartment are so shaped that the gears rotate in engagement with the walls to force and circulate oil or other liquid at varying speeds and pressures from the outer arcuate reservoir or oil storage compartment 23 through the gear compartment 22 and into the pocket 30 which becomes charged with the liquid.

The teeth of the gears 25 and 27 need not be shaped to have an accurate fit with each other, but they may have reasonably loose intermeshing engagement since regardless of wear of the gears, it will be noted that the resistance of the driven gear 27 to rotation by the driving gear 25 will always insure an oil-tight fit between the contacting surfaces of the intermeshing teeth of said gears as the pressure of the liquid carried inwardly by the disengaged teeth of the gears to charge the pocket 30 is increased as more liquid is forced therein to build up a strong resistance to oppose turning of the gears about their own axes to cause revolving of one gear about the other.

A conduit 31 leads from the pocket 30 to a cylindrical chamber 32 formed in the casing 11, and said chamber is coaxial with and opens into a larger cylindrical chamber 33 from the back wall of which leads the conduit 35 which runs back to the reservoir 23 and discharges therein.

Within the cylindrical chamber 33 is slidably mounted a piston having a head 36 and a cylindrical stem 37 slidable in the reduced cylindrical chamber 32, and longitudinally through the stem is formed a central cylindrical passage 38 giving communication between the space within the cylinder 32 in front of the valve stem and the space within the chamber 33 at the back of the piston head 36. The conduit 31 has a restricted entrance opening into the space within the cylinder 32 in front of the valve stem 37, the passage of oil or other liquid from the pocket 30 into the chamber 32 being restricted and controlled by a ball valve 40 carried by the forward end of a substantially helical compression spring 41 which holds the ball 40 against its seat in the end opening of the supply conduit 31 for admitting fluid into the chamber 32, while the rear end of the spring 41 abuts against the front end of the valve stem 37.

Means are provided whereby the escape of the liquid through the conduit 35 from the space within the cylinder 33 at the back of the piston head 36 is regulated, and as shown in the embodiment of Figs. 1 and 3, this may take the form of a screw 42 which is adjustably positioned in the back wall 12 of the casing and extends inwardly therefrom into the casing for a sufficient distance so that the inner end of the screw may be adjusted to project to the desired extent into the conduit 35 and laterally thereof whereby the passage may be partially closed more or less in accordance with the distance that the screw projects into the conduit passage as determined by the manual adjustment of the screw.

Figure 4:
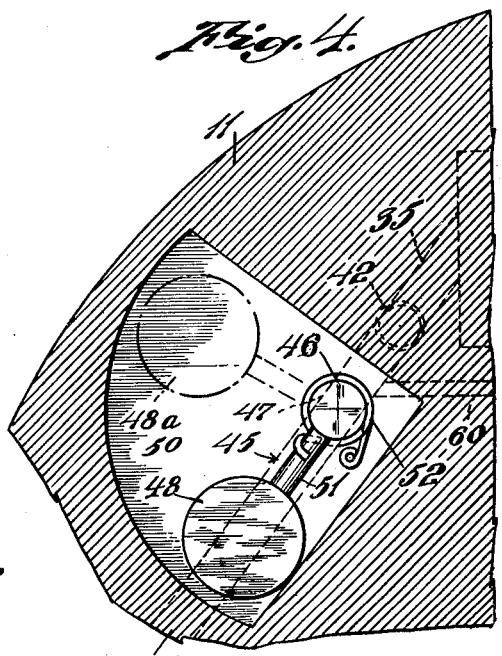
Fig. 4 is a fragmentary sectional view, on enlarged scale, taken substantially on the line 4—4 of Fig. 3 illustrating the structure and manner in which the centrifugally operated valve operates.

Means also are provided to maintain an open liquid circulation system for the movement of the pumped liquid in the pocket 30 back to the reservoir 23 as the pump gears are rotated when the engine is idling or whenever there occurs a relative slippage between the driving and driven shafts. To this end, there is provided a centrifugally operated valve mechanism generally designated 45 which, as shown in Figs. 1, 3, and 4, consists of a short shaft 46 having one end portion rotatably mounted in the casing 11 and disposed transversely of the fluid passage of the conduit 35. Formed in this end portion of the shaft 46 is a graduated transverse opening 47 which extends therethrough and has a semi-circular top and a triangular bottom, the opening 47 being brought into and out of registry with the bore of the conduit 35 when the shaft 46 is turned through approximately 90° by the action of a weight 48 housed in a sector-shaped chamber 50 and carried by the free end of an arm 51 fast to the outer end of the shaft 46 which projects into the chamber 50. The weight 48 may be of any desired shape and size but as shown it is of cylindrical form. A coiled spring 52 mounted upon the portion of the shaft within the chamber 50 has one end hooked to the arm 51 and the other end in engagement with the side of a pin 53 fixed in the back wall of the chamber 50.

Assume now that the engine is idling and that the car is stopped: Due to the action of the spring 52 on the arm 51 of the valve 45, the valve 45 will be held in its open position, as shown in full lines in Fig. 4, in which position the weight 48 will be forced against the adjacent side wall of the chamber 50 and the shaft 46 will be turned to move the graduated opening 47 therein into its wide open position and in alignment with the bore of the conduit 35. Under this condition, oil carried into the pocket 30 by the rotating pump gears 25 and 27 will pass from the pocket 30 into the circulation system of the device so that there will be movement of oil through conduit 31 past ball valve 40 and through chamber 32 and the bore of the piston 36 into chamber 33 from which the oil freely flows back to the supply reservoir 23 by passage through the return conduit 35 past the adjustable metering screw 42 and through the wide open centrifugal valve 45. The spring 41 is made a sufficient size and strength so that it will have just enough power to maintain the ball valve 40 seated in its seat in the end opening of the admission conduit 31 and in closed position when the piston 36 has been moved backwardly with its back face in engagement with the abutments or stops 55, as indicated by the dotted position of the piston depicted in Fig. 1. The force of the oil in being pumped from the pocket 30 into the conduit 31 during idling of the engine will be sufficient to overcome the power of the spring 41 and force open the ball valve 40 to allow fluid to be admitted into the chamber 32 without much resistance.

The engine, therefore, can be easily started, and it can slowly idle, since there will be no strong resistance opposing the rotation of the pump gears.

As the speed of the engine and the drive shaft is accelerated, the speed of the pump gears will be correspondingly increased for a moment or two due to the increased resistance to rotation of the shaft 14 in starting the vehicle from a standstill so that oil is pumped faster and faster into the chamber 32 from the pocket 30. However, as the pump gears tend to speed up, oil is forced at a faster rate through the conduit 31, chamber 32, and passage 38 in the piston and is caught in the space of the chamber 33 behind the piston 36 and will be held in this space since it is being forced therein at a faster speed than it can be discharged from the same through the outlet conduit 35. In this condition, further movement of oil into this space by the action of the pump gears will build up sufficient pressure against the rear surface of the piston head 36 to partially counterbalance the pressure of the pumped oil against the forward end of the valve stem 37 and the ball valve 40 and thus augment the power of the spring 41 in holding the valve 41 closed. Since this condition is practically instantaneous, the effort of the engine to maintain its speed and increase the pressure of the oil pumped into the pocket 30 will be opposed by the strong resistance of the pressure of the oil caught in the chamber 32 and the conduit 31 whereby the oil trapped in the pocket 30 will act to oppose rotation of the pump gears and increase the speed of the casing and gradually close centrifugal valve 47 against rotation and provide a direct drive when the proper amount of power generated by the engine to overcome the prevailing load conditions is transmitted from the drive shaft to the driven shaft. Consequently, as the pump gears begin to slow down in their speed of relative rotation the driven shaft 14 will start to rotate and the housing 10 also will commence to rotate therewith, the speed of increased rotation of the housing being in direct proportion to the decrease in speed of rotation of the pump gears.

As the speed of rotation of the casing increases, the weighted arm 51 is thrown outward by centrifugal action and turns the shaft 46 of the valve 45 into various partially closed positions, or into a completely closed position as indicated at 48a in Fig. 4, thereby restricting and finally closing off the escape of fluid from the pressure chamber 33 and preventing liquid from being discharged therefrom.

Provided in the casing 11 and communicating with the conduit 35 is a "pick-up" adjustment which comprises a duct 60 filled with oil or other liquid employed, having disposed transversely thereof an adjustable regulating screw 61 for regulating the flow of liquid from the space in front of the piston 36 into the duct conduit 35 with which the duct 60 communicates in order to provide a cushioning action on the piston 36 and prevent any jumping of the vehicle through sudden movement of the piston to the right by sudden acceleration of the pump gears; and the arrangement of the adjustment screw 61 is such that it may be adjusted to regulate the movement of liquid in the duct 60 to suit the load, type of vehicle, or other driving conditions. Movement of the piston to the left and into its starting position in abutting contact with the stops 55 will serve to draw in liquid from the conduit 35 back into the duct 60 and the space of the chamber 33 ahead of the piston.

In use, the entire interior of the casing 11 will be filled with oil or other fluid employed. One or more suitable plugs, as 65, may be provided for venting air through the duct 66 and the cylinder 33 from the fluid system and for filling and cleaning purposes. If desired, the chamber 50 may be filled with oil so as to cushion the action of the weighted arm 51.

The piston valve 36 should be designed so that the pressure surface at the rear face of the piston is large enough to increase the resistance to the flow of liquid from the conduit 31 into the chamber just as much as generated horsepower increases with the speed of the engine. The pendulum valve 45 takes care of loss of pressure due to acceleration in speed. The weight 48 should be so designed as to compensate for the loss of resistance when the whole transmission revolves as a unit, or in other words, the loss of pumping action as the transmission as a whole gains speed as the relative speeds decrease.

Figure 5:
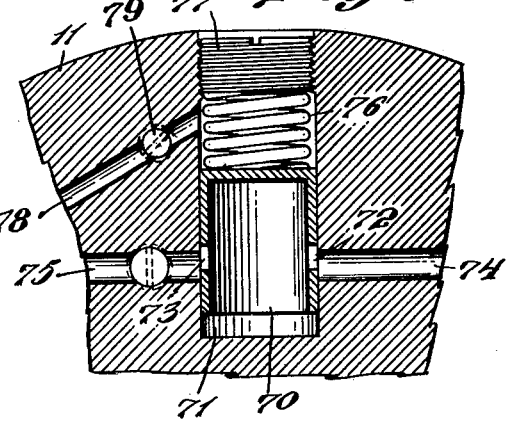
Fig. 5 is a fragmentary sectional elevational view of a modified form of fluid-actuated control valve.
Figure 6:
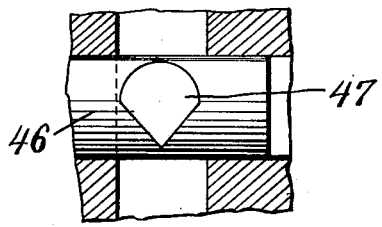
Fig. 6 is a fragmental sectional view of a portion of the valve stem of the valve referred to in Fig. 4, showing the shape of the opening therein and relation thereof to the conduit controlled thereby.

A modified liquid-actuated valve arrangement is shown in Fig. 5. An inverted cup-like cylindrical piston valve 70 is slidably fitted in a cylindrical bore 71 in the casing 11 and is provided with ports or openings 72 and 73 at diametrically opposite positions in the side walls of the valve 70, which openings register with the ducts 74 and 75 in the open position of the valve and close the ducts when the valve is moved outwardly of the bore into the closed position by the pressure of the liquid trapped in the bore 71 in the portion thereof beneath the piston due to the pumping of the liquid therein, by the pump gears 25 and 27, at a faster speed than the liquid can be discharged from the bore through the discharge opening 73 and the duct 75. A spring 76 positioned in the bore and acting between the adjustable plug 77 and the top of the piston 70 normally urges the piston inwardly of the bore, thereby tending to maintain the circulation system open to passage of fluid from duct 74 to duct 75 through ports 72 and 73 of the valve 70. It will be apparent that the plug 77 may be adjusted into different positions so as to vary the pressure of the spring 76. Duct 78 and the adjustable flow-regulating screw 79 are provided for egress of oil from the space of the bore 71 between the top of the piston and the plug 77 at a controlled rate so as to provide a cushioning action on the piston 70 and prevent any jumping of the vehicle through sudden closing movement of the piston valve 70.

I claim:

1. A hydraulic transmission mechanism comprising a drive shaft, a driven shaft, means for operatively connecting said shafts, said means including a casing, a pair of pump gears within said casing and being in mesh with each other, one of said gears being carried by and positively rotated by the drive shaft and the other loosely rotatable on the casing, a reservoir in said casing containing hydraulic fluid, a pocket into which fluid is pumped by said pump gears from said reservoir, a chamber, a supply passage leading to said chamber for admitting fluid thereto from said pocket, outlet means from said chamber leading to said reservoir, a spring-pressed ball valve in said chamber for restricting the flow of pumped liquid admitted to said chamber, and means associated with said ball valve adapted to be actuated by the fluid in said chamber to assist said spring for maintaining said ball valve in a liquid-resisting position.

2. A hydraulic transmission mechanism with which to connect a driving shaft with a driven shaft, said mechanism comprising a casing, a pair of pump gears within said casing, one of said gears being carried by the drive shaft and the other by the casing, a reservoir in said casing containing hydraulic fluid, a pocket into which said fluid is pumped by said pump gears, a chamber, a supply passage leading to said chamber from said pocket, fluid outlet means from said chamber, a spring-pressed ball valve in said chamber arranged to normally prevent ingress of fluid to said pressure chamber from said supply passage, and a hollow piston slidably fitted in said chamber cooperating with said ball valve, said piston being adapted to be actuated by the fluid pressure of the fluid trapped in said chamber to move said piston in a direction to assist said spring and exert variable pressure on said ball valve in proportion to any increase in the speed of fluid movement into said chamber whereby the ball valve will be urged into closed position.

3. A hydraulic transmission mechanism with which to connect a driving shaft with a driven shaft, said mechanism comprising a casing, a pair of pump gears within said casing, one of said gears being carried by the drive shaft and the other by the casing, a reservoir in said casing containing hydraulic fluid, a pocket into which said fluid is pumped by said pump gears, a chamber, a supply passage leading to said chamber from said pocket, fluid outlet means from said chamber, a spring-pressed ball valve in said chamber arranged to normally prevent ingress of fluid to said pressure chamber from said supply passage, and a hollow piston slidably fitted in said chamber cooperating with said ball valve, said piston being adapted to be actuated by the fluid pressure of the fluid trapped in said chamber to move said piston in a direction to assist said spring and exert variable pressure on said ball valve in proportion to any increase in the speed of fluid movement into said chamber whereby the ball valve will be urged into closed position, so that the speed of said pump gears about their own axes will tend to be diminished and they will finally be locked together so that the entire casing and the pump gear mechanism will rotate as a unit with the shafts.

4. A hydraulic transmission mechanism with which to connect a driving shaft with a driven shaft, said mechanism comprising a casing, a pair of pump gears within said casing, one of said gears being carried by the drive shaft and the other by the casing, a reservoir in said casing containing liquid, a pressure pocket into which liquid is pumped by said pump gears, a chamber, a conduit between the pressure chamber and said pocket, a return conduit leading from said chamber to said reservoir, a spring-pressed ball valve arranged to normally close the fluid admission opening of said conduit to said chamber, a hollow piston slidably fitted in said chamber and arranged to cooperate with said ball valve, said piston being adapted to be actuated by fluid pressure built up by the liquid trapped in the space of said chamber behind the rear face of said piston to move it in a direction to assist said spring and apply variable pressure to the ball valve in proportion to any increase in speed of movement of liquid into said chamber whereby the ball valve will be urged into closer liquid restricting position in said opening, and means responsive to centrifugal force adapted to control the flow of fluid through said return conduit after egress from said chamber.

5. A hydraulic transmission mechanism with which to connect a driving shaft with a driven shaft, said mechanism comprising a casing, a pair of pump gears within said casing, one of said gears being carried by the drive shaft and the other by the casing, a reservoir in said casing containing liquid, a pressure pocket into which liquid is pumped by said pump gears, a chamber, a conduit between the pressure chamber and said pocket, a return conduit leading from said chamber to said reservoir, a spring-pressed ball valve arranged to normally close the fluid admission opening of said conduit to said chamber, a hollow piston slidably fitted in said chamber and arranged to cooperate with said ball valve, said piston being adapted to be actuated by fluid pressure built up by the liquid trapped in the space of said chamber behind the rear face of said piston to move it in a direction to assist said spring and apply variable pressure to the ball valve in proportion to any increase in speed of movement of liquid into said chamber whereby the ball valve will be urged into closer liquid restricting position in said opening, and means responsive to centrifugal force adapted to control the flow of fluid through said return conduit after egress from said chamber, the said last-named means consisting of a rotatable valve member having a transverse opening for communication with the passageway of said return conduit, and a weighted arm for turning said valve member into various adjusted positions to effect either partial or complete restriction of fluid movement through said return conduit.

6. In a hydraulic system, the combination of a gear pump operable at varying speeds, a pair of intercommunicating cylindrical chambers, one of said chambers being of larger diameter than the other, a supply passage leading to said smaller chamber from the outlet side of said pump, a discharge passage provided for said larger chamber, a spring-pressed ball valve in said smaller chamber adapted to close the admission opening of said supply conduit thereto, a hollow piston slidably fitted in said large chamber and having a stem portion slidably fitted in said small chamber, said piston being arranged to cooperate with said ball valve and to be actuated by fluid pressure built up by fluid trapped in the space of said large chamber behind the rear face of said piston so as to move it in a direction to assist said spring and apply variable pressure to said ball valve for urging it into a fluid-restricting position relative to said opening.

7. In a hydraulic system, the combination of a gear pump operable at varying speeds, a pair of intercommunicating cylindrical chambers, one of said chambers being of larger diameter than the other, a supply passage leading to said smaller chamber from the outlet side of said pump, a discharge passage provided for said larger chamber, a spring-pressed ball valve in said smaller chamber adapted to close the admission opening of said supply conduit thereto, a hollow piston slidably fitted in said large chamber and having a stem portion slidably fitted in said small chamber, said piston being arranged to cooperate with said ball valve and to be actuated by fluid pressure built up by fluid trapped in the space of said large chamber behind the rear face of said piston so as to move it in a direction to assist said spring and apply variable pressure to said ball valve for urging it into a fluid-restricting position relative to said opening whereby the speed of said pump will tend to be diminished and the pump gears will finally be locked together.

8. In a fluid flow line, a conduit having an entrance and a discharge opening and a spring-pressed valve therein operable to open position by the pressure of the fluid flowing through said conduit, and means within said conduit at a location intermediate the valve and the discharge opening of said conduit and engaging said spring and operable by the pressure of the fluid to control the closing of said valve through said spring when the flow of fluid at the intake of said conduit increases beyond the amount of the discharge of said fluid from said conduit.

9. In a fluid flow line, a conduit having an entrance and a discharge opening and a spring pressed valve therein operable to open position by the pressure of the fluid flowing through said conduit, means for automatically controlling the closing of said valve including a piston in said conduit positioned therein at a location intermediate the said valve and the discharging opening of said conduit and engaging said spring and having opposite surfaces of unequal areas exposed to the fluid in said conduit and movable to close said valve through said spring when the flow of fluid at the intake of said conduit increases beyond the amount of the discharge of said fluid from said conduit.

10. In a hydraulic system, the combination of a pump operable at varying speeds, a chamber, a supply passage leading to said chamber for admitting fluid thereto from the outlet side of said pump, an outlet passage separate from said supply passage and leading from said chamber to the inlet side of said pump, means in said outlet passage operable for regulating the flow of fluid therethrough, and valve means in said chamber actuated by the combined action of a spring and fluid pressure.

11. A hydraulic transmission mechanism comprising a drive shaft, a driven shaft, means for operatively connecting said shafts, said means including a casing, a pair of pump gears within said casing and being in mesh with each other, one of said gears being carried by and positively rotated by the drive shaft and the other loosely rotatable on the casing, a reservoir in said casing containing hydraulic fluid, a pocket into which fluid is pumped by said pump gears from said reservoir, a chamber, a supply passage leading to said chamber for admitting fluid thereto from said pocket, outlet means from said chamber leading to said reservoir and a valve in said chamber operable by the pressure developed in said chamber operable by the pressure developed in said chamber for controlling the flow of liquid admitted to said chamber.

12. A hydraulic transmission mechanism comprising a drive shaft, a driven shaft, means for operatively connecting said shafts, said means including a casing, a pair of pump gears within said casing and being in mesh with each other, one of said gears being carried by and positively rotated by the drive shaft and the other loosely rotatable on the casing, a reservoir in said casing containing hydraulic fluid, a pocket into which fluid is pumped by said pump gears from said reservoir, a chamber, a supply passage leading to said chamber for admitting fluid thereto from said pocket, outlet means from said chamber leading to said reservoir and a piston in said chamber exposed and operable by the pressure of the fluid developed in said chamber for controlling the flow of liquid admitted to said chamber.

JOHN T. CORRIGAN.